United States Patent [19]

Kimura et al.

[11] Patent Number: 4,558,326

[45] Date of Patent: Dec. 10, 1985

[54] PURGING SYSTEM FOR INK JET RECORDING APPARATUS

[75] Inventors: Yoshiaki Kimura, Hachioji; Yasuhiko Tanaka, Kodaira, both of Japan

[73] Assignee: Konishiroku Photo Industry Co., Ltd., Tokyo, Japan

[21] Appl. No.: 529,611

[22] Filed: Sep. 6, 1983

[30] Foreign Application Priority Data

| | | | |
|---|---|---|---|
| Sep. 7, 1982 | [JP] | Japan | 57-156085 |
| Sep. 13, 1982 | [JP] | Japan | 57-160700 |
| Sep. 21, 1982 | [JP] | Japan | 57-165270 |
| Sep. 29, 1982 | [JP] | Japan | 57-171120 |
| Sep. 29, 1982 | [JP] | Japan | 57-171121 |
| Sep. 29, 1982 | [JP] | Japan | 57-171122 |

[51] Int. Cl.4 ........................ G01D 9/00; G01D 15/16

[52] U.S. Cl. ................................ 346/1.1; 346/140 R

[58] Field of Search ........................ 346/140 PD, 1.1; 239/104, 105, 106; 222/108, 109, 110, 111

[56] References Cited

U.S. PATENT DOCUMENTS 4,123,761 10/1978 Kimura ........................ 346/140 PD
4,376,283 3/1983 Kimura ........................ 346/140 PD

FOREIGN PATENT DOCUMENTS 55-53570 4/1980 Japan .
56-113464 9/1981 Japan .

*Primary Examiner*—E. A. Goldberg
*Assistant Examiner*—M. Reinhart
*Attorney, Agent, or Firm*—Frishauf, Holtz, Goodman & Woodward

[57] ABSTRACT

In an ink jet recording apparatus of the ink-on demand type, the recording ink is forcibly sent from a pressure chamber in the recording head to nozzles which jet the recording ink onto a recording medium. An ink cartridge is a closed-up rigid body having an opening therein which permits gas to flow in and out of the rigid body. The rigid cartridge body contains a flexible ink container bag which contains recording ink. A pressurized gas supply is connected to the ink cartridge body in communication with the opening thereof for increasing the pressure inside the ink cartridge body and for thereby increasing the pressure of the ink in the flexible container bag due to flexing of the bag under increased pressure. A cap made of elastic material is coupled to the cartridge body so as to be connected to the ink container bag in a liquid-type manner to supply recording ink from inside the ink container bag to the recording head under pressure to purge the recording head of bubbles and of ink previously contained therein.

14 Claims, 19 Drawing Figures

PURGING SYSTEM FOR INK JET RECORDING APPARATUS

BACKGROUND OF THE INVENTION

1. Field of the Invention

The present invention relates to a method for the ink jet recording and apparatus therefor, and particularly to purging bubbles off the ink flow path between the ink tank and the recording head of the apparatus.

2. Description of the Prior Art

Ink jet recording apparatus records letters or characters, graphic patterns, and the like, on a recording medium by jetting thereonto an ink in the form of droplets through slender nozzles. In order that the apparatus draws high-quality letters or charaters, graphic patterns, and the like the apparatus must be capable of performing a regular and intermittent jet of minute and equal-size ink droplets. For a smooth jet fly operation of such ink droplets and for stable drawing on a recording medium of letters or characters, graphic patterns, and the like, not only does the nature of the ink itself need to be sufficiently uniformly stable but the ink flow path between the ink tank and the recording head must be kept from the mixing thereinto of air bubbles.

Further, there often occurs clogging of the nozzles with solid matter produced in the ink, such as clots of the ink dried inside the nozzles, dust, paper dust, and the like, resulting in malfunction of the ink jet or unstable ink jet as well as in the lowering of the jetting capability such as the jet efficiency, the stability, responsiveness, etc., of the formation of ink droplets, and the like. Therefore it is necessary to get rid of such impurities as mentioned above.

As has been described, in the ink jet recording apparatus, it is indispensable to completely purge the ink flow path of the bubbles produced therein or solid matter that have mixed thereinto.

Where bubbles or foreign matter were present inside the nozzles of the recording head or inside the ink flow path, the following procedures have hitherto been taken:

(1) The ink tank is pressed partially to increase the ink pressure to thereby expel the bubbles, foreign matter, etc., together with the ink from the nozzles forming the tip of the ink flow path.

(2) A pressure chamber having an electrically driven pump or the like is provided in the middle of the ink supply system that connects the ink tank to the recording head to let the ink flow therethrough, and the ink with the flow quantity and pressure thereof increased by the pump is sent toward the nozzle side to thereby expel the bubbles, foreign matter, etc., from the nozzles (Japanese Patent Publication Open to Public Inspection (hereinafter referred to as Japanese Patent O.P.I. Publication) No. 53570/1980 and the like.).

(3) With a cap placed closely to the points of the nozzles, the bubbles, foreign matter, etc., are sucked up along with the ink by a suction pump from the nozzles (Japanese Patent O.P.I. Publication No. 113464/1981).

However, the above procedures for purging bubbles and foreign matter have the following disadvantages which have been in question in the practical application.

The way of mechanically pressing the tank of (1) is lacking in the pressure accuracy as well as in the pressure stability, particularly it is difficult to apply a given constant pressure regardless of the residual quantity of the ink in the tank.

The pressurizing way by use of a pressure pump of (2) requires an expensive pump for liquid use, so that it becomes a problem in respect of cost.

The way of sucking from the points of the nozzles of (3) requires a complex and expensive apparatus and also requires a high accuracy due to the mutual relation between the sucking rate and the ink supply rate.

As described above, any of the conventional purging means is insufficient with respect to the structure, cost and stabilty thereof.

On the other hand, in the ink jet recording apparatus, as the ink supply means to supply ink to the recording head, there is usually used an airtight ink cartridge to keep the ink stable from air. The ink cartridge comprises a highly hermetically sealed bag or container containing ink. This ink cartridge is provided attachably and detachably in a cartridge receiving position, and the replacement of the cartridge enables the replenishment of new ink.

OBJECTS AND SUMMARY OF THE INVENTION

The present invention has been made for the purpose of purging the foregoing ink flow path of the bubbles or solid matter thereinside with use of the above-mentioned interchangeable ink cartridges.

It is an object of the present invention to provide a method for the ink jet recording which, in case of the above trouble, is easily restorable by means of running ink under pressure to the nozzles.

It is another object of the present invention to provide ink jet recording apparatus having means of running ink under pressure to the nozzles to purge the ink flow path of the apparatus.

The present invention is such that in an ink jet recording apparatus having a pressure chamber and an ink-on-demand type recording head having nozzles that are connected by an ink flow path to the pressure chamber, and the ink in the chamber is pressurized to run out of the chamber to the nozzles to be jetted therethrough to make recordings, the ink jet recording apparatus comprises an ink container made of a flexible material filled with a recording ink, an ink cartridge comprised of a rigid housing which is to house the ink container and which has a gas conduction-exhaust opening, and gas pressurizing means which is provided outside or inside the cartridge, the gas pressurizing means, during the non-jet recording period, conducting forcibly a gas through the gas conduction opening into the cartridge to increase the pressure thereinside to thereby expel from the recording head the bubbles or solid matter thereinside along with the ink.

The present invention provides at a low cost a highly accurate and highly stable purging means of which the structure is simple and which is operable without fail.

The characteristics of the purging means in the jet recording apparatus of the present invention are as follows:

(a) The purging means is capable of forcibly running ink under always constant pressure regardless of the residual quantity of the ink in the ink container.

(b) The changeover from the ink supply under normal hydrostatic pressure during the recording period to the ink supply under pressure for the purge during the non-recording period can be easily made.

(c) Uniform pressure is applied to the ink in the ink cartridge.

(d) No partially excessive force is applied to the ink container, so that the ink container is by no means ruptured.

(e) The structure is so simple that the operation can be made without fail.

(f) The overall cost can be reduced.

DETAILED DESCRIPTION OF THE INVENTION

Figure 1:
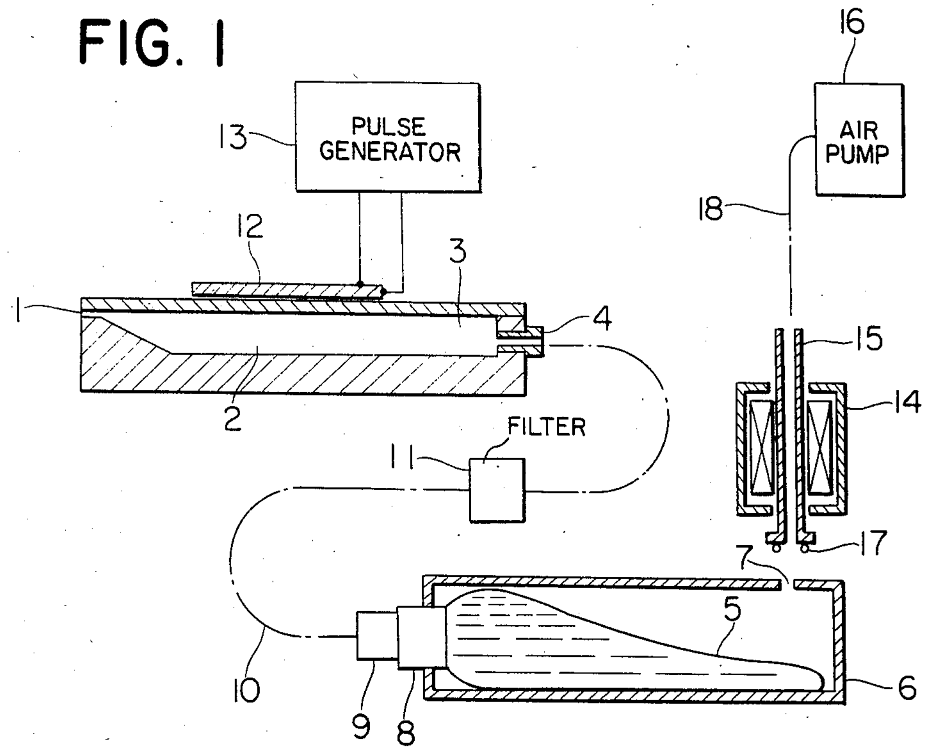
FIG. 1 is a cross-sectional view of an example of the ink jet recording apparatus of the present invention.

The present invention is illustrated in detail in accordance with the drawings. FIG. 1 shows an outline of the ink jet recording apparatus of the present invention, wherein the recording head comprises a plurality of nozzles 1 which jet ink droplets, a plurality of pressure chambers 2 which lead stretching to the nozzles 1, a common ink chamber 3 which distributes ink to the respective pressure chambers 2, and an inlet means 4 which conducts ink from an ink cartridge into the common ink chamber 3. The recording ink is filled in a highly airtight container bag 5 which is housed in a cartridge body 6, the container bag being made of a flexible material, which is hermetically sealed so as to prevent the entry of air thereinto.

The ink cartridge is comprised of cartridge body 6 which is nearly airtight and which is pierced at an end portion thereof with a vent hole 7, the foregoing ink container bag 5 which is housed in cartridge body 6, and a cap 8 which keeps the ink in container 5 from air and which is made of an elastic material and provided at the other end of cartridge body 6. The cap 8 of the above cartridge is attachable and detachable to a connector 9 which is fixed to a part of the recording apparatus. One end of an ink supply pipe 10 is connected to the connector 9, and the other end of the supply pipe 10 is connected through a filter 11 to inlet means 4 of the recording head.

In addition, the foregoing ink container bag 5 housed inside cartridge body 6 composed of rigid walls is made of a flexible material in the form of a single layer or laminated layers, such as any of, e.g., polyethylene, polypropylene, vinyl chloride, vinylidene chloride, polyesters, nylon, and the like. Cap 8 and connector 9 allow the running of the ink from the cartridge through a tubule, built in either the cap or the connector, which pierces the elastic packing member into the ink supply pipe.

In the thus structured ink supply system, by manually connecting the ink cartridge to connector 9, the ink in the container runs through cap 8 joined with connector 9 into flexible ink supply pipe 10, further through filter 11, and then flows through inlet means 4 into the recording head. The ink that has been supplied to the recording head first enters common ink chamber 3, from which the ink further branches off to a plurality of pressure chambers 2 which lead to a plurality of nozzles 1 corresponding to vertically aligned recording spots of dot-matrix charactors to be recorded. Thus, the inward behind the nozzles 1 is filled with the ink from the ink cartridge. The level of the ink inside the ink cartridge is held lower than that of the nozzles 1, and the normal hydrostatic pressure of the ink at the nozzle throat and the surface tension of the ink form a meniscus of the ink, thus keeping an equilibrium, so that during the non-recording period, no ink leaks out of the nozzles 1.

On the other hand, one of the walls of each of the foregoing pressure chambers 2 is resilient, and the external surface of the wall is provided with a piezoelectric transducer element 12 attached thereto, which is electrically connected to an electron pulse generator 13. The piezoelectric transducer element 12 is an appropriate resilient plate which, upon receiving an electric signal from the pulse generator 13, is capable of bending toward the inside of pressure chamber 2 and which is made of, e.g., a piezoelectric crystal and actuated by means of a conductive thin layer on the external surface of the wall of the pressure chamber.

In the ink jet recording apparatus having the above construction, piezoelectric transducer element 12, upon receiving a signal from electron pulse generator 13, promptly bends toward the inside of pressure chamber 2 to promptly reduce the volume of pressure chamber 2, thereby forcing the inside ink out from nozzles 1 to fly in the form of droplets onto a confronting and relatively moving recording medium to thereby form a dot image thereon.

The ink cartridge pressurizing means in the present invention is subsequently illustrated with reference to FIG. 1. Cartridge body 6, which houses the foregoing ink container 5 is of a closed-up structure except for the vent hole 7, and usually, as shown in the drawing, air freely flows through the vent hole in and out of the cartridge body. With the ink cartridge correctly loaded by connecting it to connector 9 of the recording apparatus body, a coupling means 14 is fixedly provided above the vent hole of the cartridge. Coupling means 14 has in the center thereof a movable hollow shaft 15 an end of which is connected to a compressor air pump 16 and the other end of which is provided with an elastic packing member (e.g., O ring) 17. Coupling means 14 is, for example, an electromagnetic solenoid whose movable iron core shaft 15, when the coil built in the solenoid is energized, moves up and down. Movable shaft 15 is hollow, and the hollowness forms an air flow path through which the compressed air sent through a tube 18 from compressor air pump 16 runs to reach the other end.

When the previously mentioned purge should be carried out during the non-recording period, by the operation of an automatic or manual switch, the solenoid of coupling means 14 is turned ON to thereby push movable shaft 15 down close through packing member 17 to cartridge body 6, thereby forming a consistently coupled closed-up air flow path from air pump 16 through tube 18, movable shaft 15, packing member 17 and vent hole 7 to cartridge body 6. Under this condition, air pump 16 is automatically operated, from which air is forced to run through the above air flow path into cartridge body 6, to increase the air pressure thereinside to thereby compress the inside ink container bag 5, whereby the ink contained in the container is pressurized, and as a result, the ink is forced to run from container 5 through cap 8 and connector 9 connected thereto, ink supply pipe 10 and filter 11 to be led through inlet means 4 into the recording head, and finally jetted out through nozzles 1. At this point of time, the bubbles and foreign matter that have been present inside nozzles 1 and the recording head are expelled along with the jetted ink from nozzles 1, thus purging the nozzle and the recording head, whereby the nozzles become clear of the clogging.

When resuming the ink jet recording operation after completion of the purge operation, the power supply to coupling means 14 is turned OFF to turn the coil current OFF to thereby restore movable shaft 15 to the original position thereof, and thus the packing member, the tip of movable shaft 15, becomes apart from the external surface around the vent hole of cartridge body 6. At the same time, the power supply for compressor air pump 16 is also turned off to suspend the pumping operation. Thus the pressure air inside cartridge body 6 flows out through vent hole 7, so that the air inside the cartridge becomes kept under the atmospheric pressure to thereby enable the ink droplets jet under the foregoing normal hydrostatic pressure.

Figure 2:
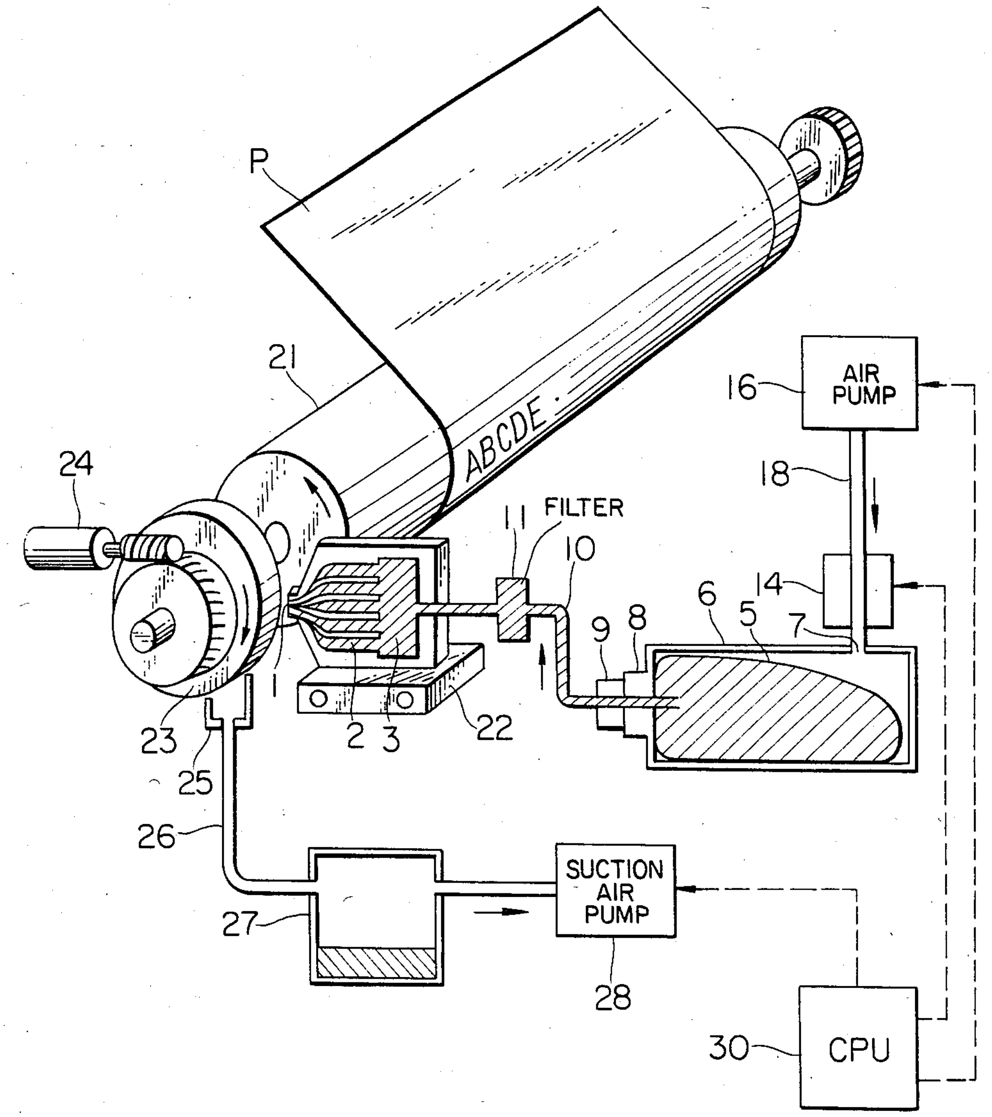
FIG. 2 is a schematic diagram illustrating the operation of the ink jet recording apparatus of the present invention.

The ink supply operation of the ink jet recording apparatus of the present invention is then illustrated in reference to FIG. 2. In the drawing, P is a recording paper, 21 is a cylindrical platen which supplies recording paper P. Platen 21 is driven by a motor (not shown) to rotate to transport paper P in close contact with platen 21.

The recording head have a plurality of nozzles 1 is loaded on a carriage 22, and moved closely to recording paper P from left to right, and vice versa, along the axial direction of platen 21 by a wire or belt (not shown) and a motor (not shown) connected to carriage 22. The recording head, during the lateral movement thereof, jets ink droplets from the nozzles 1 toward recording paper P, thereby forming a dot-matrix characters or graphic patterns on the recording paper.

If bubbles and solid matter are mixed into the recording head, any satisfactory recording cannot be performed as described above. When a trouble in the ink jet is detected, or at a regular interval, or just before starting the recording operation, the ink is forced out of the ink container into the recording head to forcibly purge the bubbles and solid matter off the ink flow path. In order to do this, carriage 22 with the recording head loaded thereon is moved toward a cleaning roller 23 provided axially to platen 21 and settled in the position (purging position) that the nozzles' points confront closely to the periphery of cleaning roller 23. FIG. 2 is a schematic illustration showing this condition, in which cleaning roller 23 is rotatable by means of a coaxially fixed worm gear and a worm engaging therewith and a drive motor 24. An ink waste receiver 25 is provided closely to and underneath the periphery of cleaning roller 23, and connected to the train of pipe 26, waste recovery tank 27 and suction air pump 28.

As has been described, in the ink jet recording apparatus in accordance with the present invention, the system to perform the purge operation consists of the following three broadly systematic paths:

(1) The compressed air supply path from compressor air pump 16 through coupling means 14 to cartridge body 6, (2) the ink forcible supply path from ink container 5 to nozzle 1 of the recording head, and (3) the air-ink waste suction path from cleaning roller 23 through waste receiver 25 and waste recovery tank 27 to suction air pump 28.

And the respective systematic paths to carry out the above purge operation are controlled by a microcomputer (hereinafter abbreviated to CPU) 30. That is, two air pumps 16 and 28 and coupling means 14 start and stop the operations thereof according to a command from CPU 30.

During the recording operation, both compressor air pump 16 and suction air pump 28 are in the stop position, and coupling means 14 opens vent hole 7, so that the inside of cartridge body 6 is under atmospheric pressure. Under this condition, the ink inside ink container 5 is replenished into the recording head, which jets the ink in response to the signal from electron pulse genetator 13.

During the recording operation, if an ink jet failure by the clogging or the like of nozzles 1 as described above were detected, or in the case of intermittently jetting at a regular interval for the purpose of preventing possible clogging, or prior to starting the recording operation, or when the purge operation becomes necessary for some other reasons, the recording head is first moved to the specified purge position outside the transport position of recording paper P so that nozzles 1 and cleaning roller 23 faces each other. Next, the command from CPU 30 causes the solenoid of coupling means 14 to be turned ON to thereby move the movable shaft 15 down so that packing member 17 at the tip of the shaft presses on and comes in close contact with the external wall surface around vent hole 7 of cartridge body 6, and thus compressor air pump 16 and the ink cartridge become in the closely linked-up condition.

In succession, the command from CPU 30 turns both compressor air pump 16 and suction air pump 28 ON to start the operations thereof, respectively, whereby the compressed air from compressor air pump 16 is forced to flow through tube 18 and coupling means 14 into cartridge body 6, and thus the inside of cartridge body 6 reaches a specified pressurizing condition, whereby the ink inside ink container bag 5 is pressured, and the pressured ink is forced to flow through cap 8, connector 9, ink supply pipe 10 and filter 11 into the recording head, wherein the ink passes through common ink chamber 3, pressure chambers 2 and nozzles 1 to be jetted out. At this point of time, the bubbles and solid matter that have been present inside the ink paths, and particularly inside nozzles 1 are purged therefrom to clear the inside of the ink flow paths.

On the other hand, the ink jetted out from nozzles 1 onto the peripheral surface of cleaning roller 23 located facing closely to nozzles 1, and the ink is transported onto and spread over the peripheral surface of the rotating cleaning roller and then falls in drops into the underneath waste receiver 25, which is being sucked by the foregoing suction air pump 28 to completely absorb the ink that has fallen from the surface of cleaning roller 23. The ink that has entered ink waste receiver 25 is then pulled by the suction air to flow through pipe 26 into waste recovery tank 27.

After completion of the above purge operation, by a command from CPU 30, both air pumps 16 and 28 are turned OFF to thereby stop the air flow. By the subsequent command from CPU 30, the solenoid of coupling means 14 is turnd OFF to let movable shaft 15 return to the original position to thereby release the connection thereof to cartridge body 6, whereby the pressurizing air inside cartridge body 6 flows out through vent hole 7 into the outside atmosphere, and thus the inside of cartridge body 6 returns to normal atmospheric pressure. Along with this, the pressure of the ink contained in ink container bag 5 also returns to normal atmospheric pressure. Slightly later than this, the ink pressure inside the recording head leading to the ink inside ink container bag 5 also becomes gradually lowered and finally returns to normal atmospheric pressure. When the ink pressure inside the recording head reaches nearly normal atmospheric pressure, the recording head moves apart from the purge position to the ink jet recording position.

In addition, in the above description, two exclusive pumps 16 and 28 for compressing and suction purposes, respectively, but the use of a single air pump may be allowed for both compressing and suction purposes. Alternatively, two pumps 16 and 28 may be driven by a common power source (such as a motor, an electromagnetic actuator, or the like). Such means serves for the reduction of cost or for saving the spacing of the installation.

Figure 3:
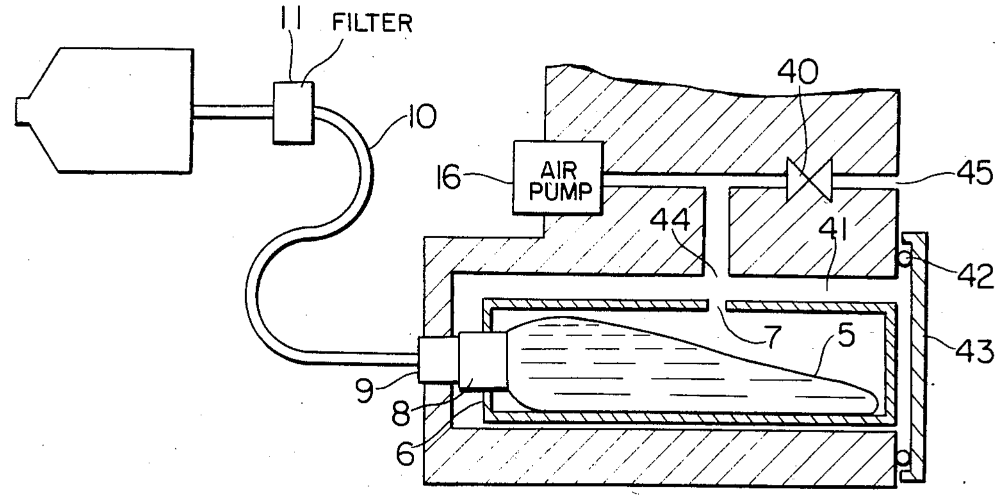
FIGS. 3, 4 and 5 are cross-sectional views of other examples of the ink pressurizing means used in the ink jet recording apparatus of the present invention.

FIG. 3 is a schematic illustration showing another example of the present invention. This shows a pressurizing mechanism of the construction that uses no coupling means 14 having movable shaft 15 but has a control valve 40 fixed to the recording apparatus. The insertion entry of a cartridge loading chamber to house an ink cartridge is so constructed as to be isolated from the outside air in the way that it is closed up by a tight cover 43 having a sealing member (e.g., O ring) 42. One of the walls of cartridge loading chamber 41 is pierced with an air intake 44 which leads through a path hole to a compressor air pump 16. Concurrently, air intake 44 leads through a control valve 40 to an air exhaust port 45 which is open to the outside air. Control valve 40 is, for example, an electromagnetic valve operated by a solenoid or a liquid control valve, which makes ON-OFF control of the air pressure inside the above-mentioned air flow paths.

When performing the purge operation, control valve 40 is first closed, and compressor air pump 16 is then operated to conduct compressed air through air intake 44 and vent hole 7 into cartridge body 6 to increase the air pressure thereinside to pressurize ink container bag 5, whereby the ink is pressured to purge as previously mentioned the bubbles and solid matter present inside the recording head from the nozzles 1 thereof. The recovery of the expelled ink is also made in the same manner as previously mentioned. After completion of the purge operation, the operation of compressor air pump 16 is stopped, and at the same time, control valve 40 is opened, whereby the pressurizing air inside the cartridge body flows through vent hole 7, air intake 44 and control valve 40 out from air exhaust port 45 to the outside, and thus the ink pressure returns to normal atmospheric pressure. This condition is ready for the recording operation. In addition, the replacement of ink cartridges is to be made by opening and closing tight cover 43.

Figure 4:
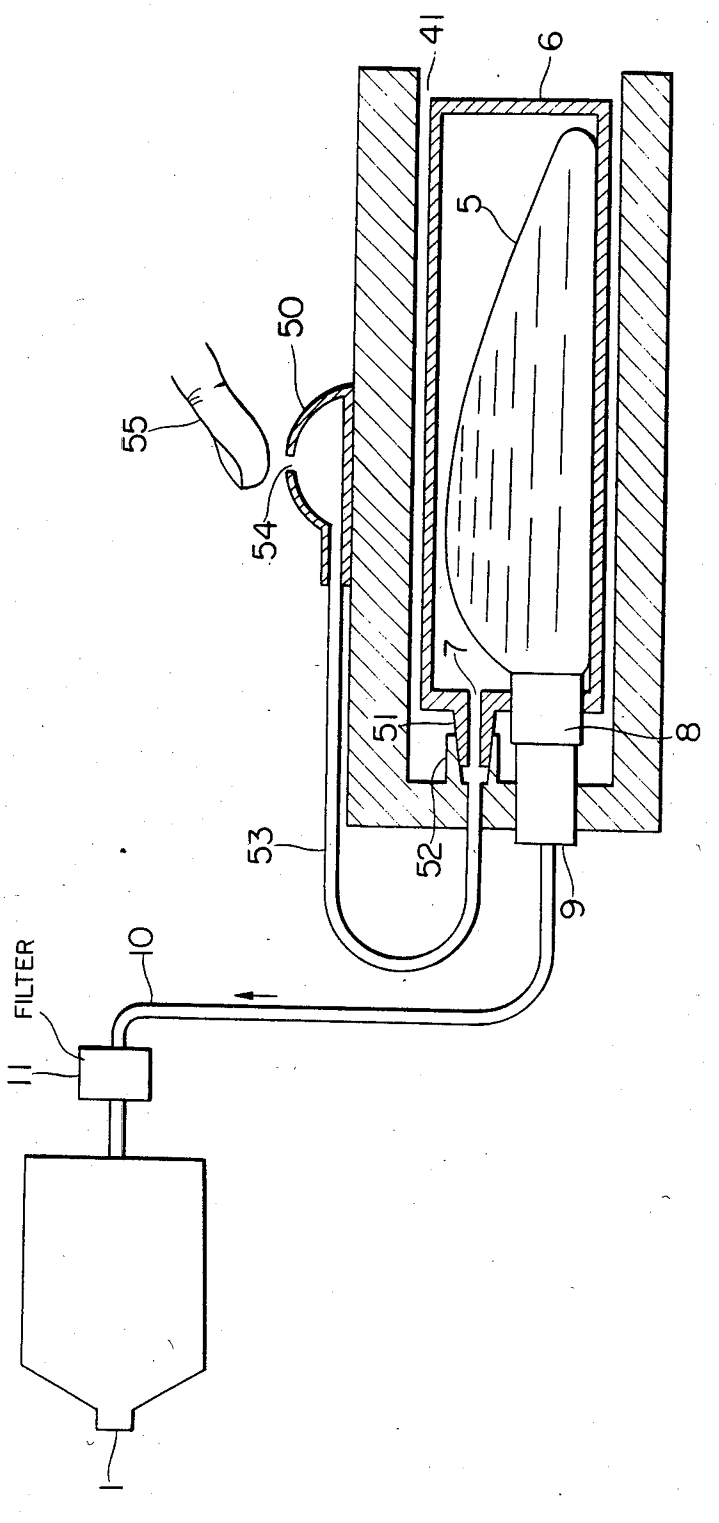

FIG. 4 shows the construction in which as the pressurizing means, a manual means is used in place of the electrically driven air pump, and the coupling means is further simplified. One of the walls of ink cartridge body 6 is provided with a tapered hollow projection 51 sticking out from the wall in the position parallel with cap 8, and the inside of projection 51 is pierced with a vent hole 7. The inside of a cartridge loading member 41 on the recording apparatus body side is provided with a coupling member 52 in such a form as to fit in with and be coupled to projection 51. The other end of coupling member 52 is connected to a pipe 53 and further to a manual blower 50 which is composed of an elastic and flexible wall in the hemispherical or Japanese lantern form, a portion of which wall is pierced with a vent hole 54. In the condition that the vent hole is open, the air flow path from manual blower 50 through pipe 53, coupling member 52, and hollow projection 51 to cartridge body 6 is all under normal atmospheric pressure. Under this condition, the ink jet recording operation takes place. In addition, the above blower is formed of such a material as natural rubber, synthetic rubber, plastics, or the like.

When the purge operation is necessary, vent hole 54 of manual blower 50 is closed by a finger tip 55 or by any appropriate operation member to compress the inside air, and the reduction of the inside volume forces the inside air to run into cartridge body 6 to increase the air pressure thereinside to pressurize the ink in the ink cartridge to thereby purge in like manner the bubbles and solid matter together with the ink out from nozzles 1. After completion of the purge operation, when letting go finger tip 55's hold on vent hole 54 of manual blower 50, the inside of manual blower 50 is immediately restored to normal atmospheric pressure, and the air pressure inside the cartridge body and the ink pressure also are restored to normal atmospheric pressure, thus becoming ready for the recording operation. This construction is simple and effectively used for recording apparatus of which the purge operation can be made sufficiently with a relatively small pressure.

Figure 5:
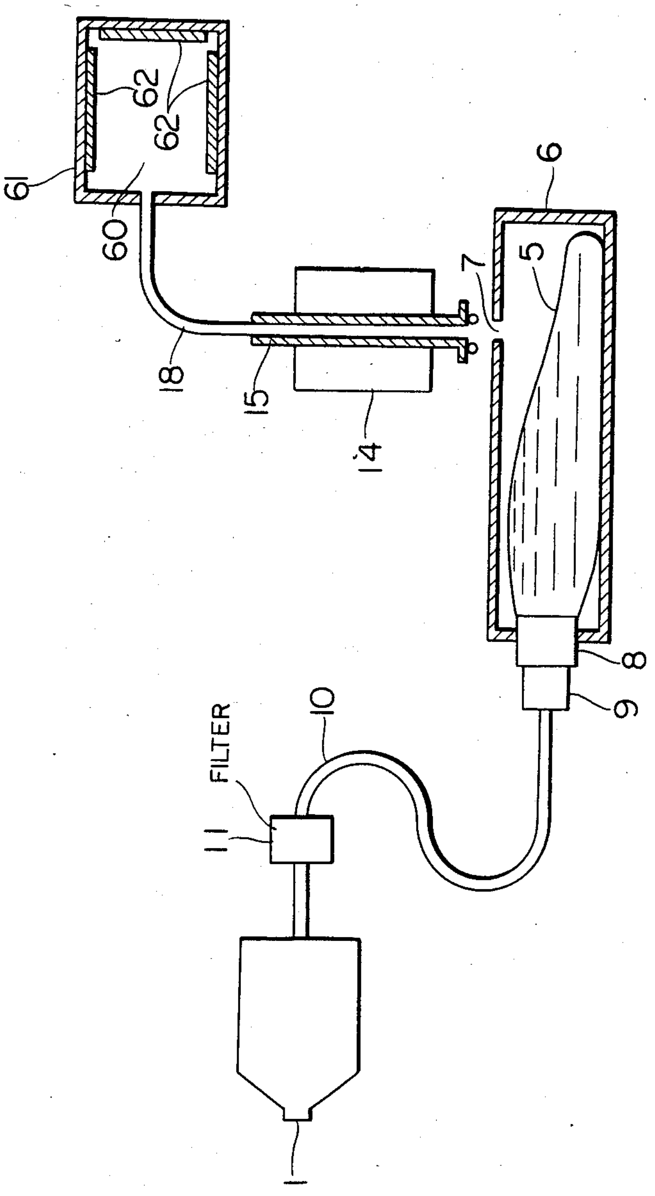

FIG. 5 is a schematic cross-sectional view of a further example of the present invention. This shows the construction in which in place of the compressor air pump 16 of FIGS. 1 and 2, a heating chamber 60 is used. Heating chamber 60 is composed of a nearly closed-up rigid housing, and electric heaters 62 which are provided on the inside walls of the housing. One of the walls has an opening that is connected to a pipe 18.

When the purge operation is necessary, coupling means 14 is turned ON to drive movable shaft 15 to closely connect it to a cartridge body 6, thereby establishing a completely closed-up consistent air flow path from heating chamber 60 through coupling means 14 to cartridge body 6. Concurrently, heaters 62 of heating chamber 60 is turned ON to increase the inside temperature of the heating chamber, and the thermal expansion thereby increases the inside air pressure, which is utilized to increase the air pressure inside the cartridge body as well as the ink pressure. This system requires no power driving means such as the air pump nor electrically operating means such as the control valve in the previous examples, and the structure thereof is simple and the maintenance thereof is easy, but each component part must be heat-resistant.

Figure 6:
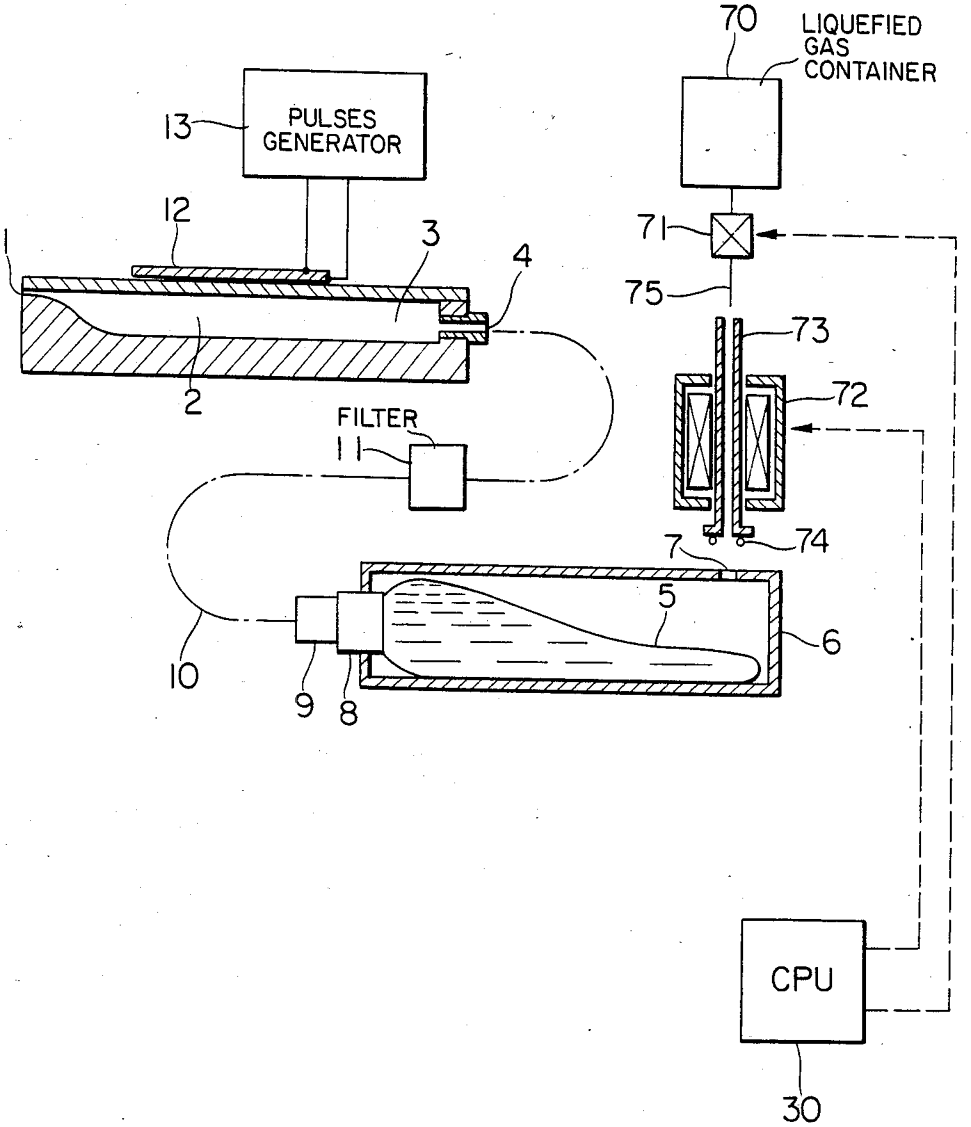
FIGS. 6, 7, 8 and 9 are cross-sectional views of examples of the ink jet recording apparatus which uses a liquefied gas as the foregoing ink pressurizing means.

Further, as pressurizing means, the above-described air pump 16, manual blower 50, heating chamber 60 or various appropriate others may be applied. FIG. 6, as an example thereof, is a drawing showing the ink jet recording apparatus provided with a liquefied gas container as pressurizing means, wherein in place of the air pump 16, a liquefied gas container 70 and a control valve 71 are provided, which are connected to coupling means 72 to thereby make pressurizing and releasing operations. This system is suitable for the purging operation which requires a high pressure in a short period of time.

The liquefied gas in liquefied gas container 70 is a gas compressed to be in the liquid form, and as the gas, there may be used liquefied hydrocarbons such as butane, propane, ethane, methane, and the like, or such liquefied gas as liquefied carbon dioxide or polyhalogenated hydrocarbons containing fluorine and chlorine (the so-called flon gas), and the like. Any of these liquefied gases is stored in the liquid form in interchangeable cartridges, but, when released into the atmosphere, is rapidly gasified to become increasing its volume, and, when in a closed-up gas chamber, increases the gas pressure thereinside.

When the purge operation is necessary during the non-recording period, an automatic operation by, e.g., microcomputer control, or manual switch operation turns the solenoid of coupling means 72 ON to move down movable shaft 73 so that the shaft with its packing member 74 comes in close contact with cartridge body 6, thereby establishing a closed-up gas flow path from control valve 71 through tube 75, movable shaft 73, packing member 73 and vent hole 7 to cartridge body 6. When control valve 71 is opened under this condition, the liquefied gas in liquefied gas container 70 becomes a pressured gas flow to be blown out from control valve 71 to flow through the above established gas flow path into cartridge body 6 to increase the gas pressure thereinside to compress the inside ink container bag 5, whereby the inside ink is pressured. As a result, the ink contained in ink container 5 is forced to run through cap 8 and connector 9 connected thereto, further through ink supply pipe 10, filter 11, and inlet means 4 into the recording head and jetted out from nozzles 1 to the outside. At this point of time, the bubbles and foreign matter present in the recording head is expelled along with the ink from nozzles 1, whereby the purging of the nozzles and others is made so that the clogging is cleared.

After completion of the above purge operation, when resuming the recording operation, the power supply to coupling means 72 is turned OFF to thereby shut off the coil current of the solenoid to restore movable shaft 73 to the original position, whereby packing member 74 at the tip of movable shaft 73 moves apart from the external surface of the wall of cartridge body 6. At the same time, control valve 71 is operated to shut off the flow path to tube 75, so that the pressured gas supply operation is stopped. Thus the pressurizing gas present inside cartridge body 6 flows out through vent hole 7 to the outside. After that the gas pressure inside the cartridge body becomes normal atmospheric pressure, thus enabling the ink-droplet jet under the foregoing normal hydrostatic pressure.

Figure 7B:
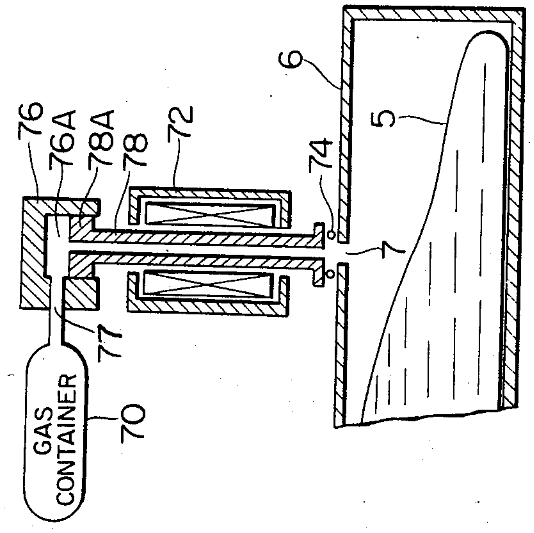
Figure 7A:
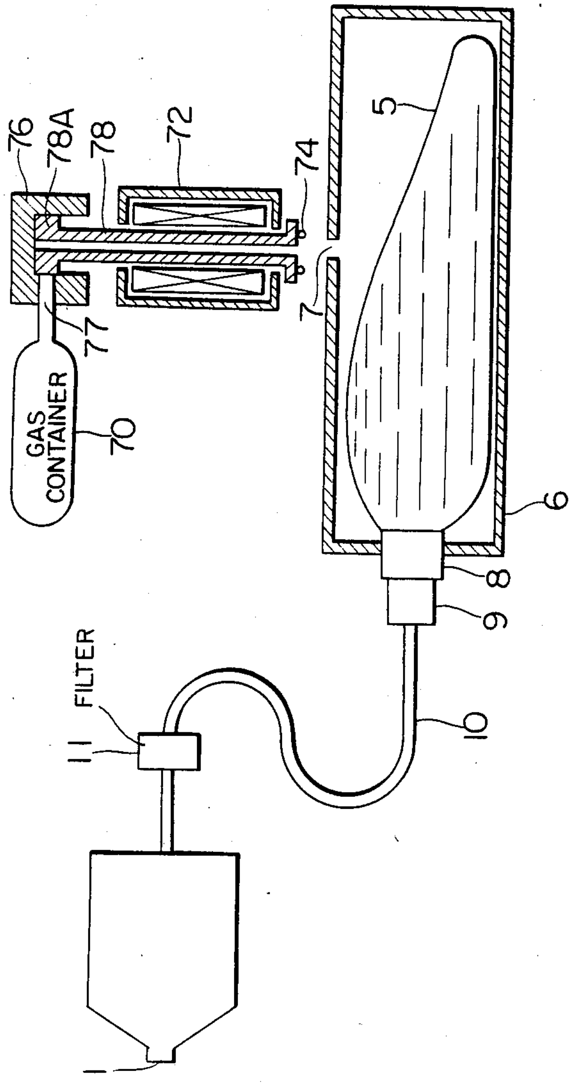

FIG. 7(A) and (B) are schematic illustrations of another example of the present invention, which show the construction wherein one end of the hollow movable shaft of the foregoing coupling means 72 directly serves as the control valve instead of being connected to tube 75. FIG. 7(A) is a cross-sectional view showing the condition prior to the pressurization, while FIG. 7(B) also is cross-sectional view showing the condition wherein a pressurizing gas is being supplied for the purge operation. In the figures, liquefied gas container 70 is attachably and detachably connected to a cylinder 76 that is fixed to the apparatus body. Cylinder 76 has thereinside a variable gas chamber 76A which leads through a gas intake 77 to the inside of liquefied gas container 70.

On the other hand, the tip portion of hollow movable shaft 78 which pierces the inside of coupling means 72 and is reciprocatingly movable is slidable on the inside wall of gas chamber 76A inside cylinder 76 and forms a head 78A which functions as a piston.

During the normal ink jet recording operation or during the downtime of the recording apparatus, as shown in FIG. 7(A), head 78A is pushed up against the inner end plane of the internal wall of gas chamber 76A inside cylinder 76, and at the same time, gas intake 77 is closed. At this time, the other end of movable shaft 78, that is, the end plane having packing member 74 is apart from the external wall surrounding vent hole 7 of cartridge body 6. In this condition, the pressurizing gas inside liquefied gas container 70 is in the closed-up condition by the closing of gas intake 77, so that no gas supply is performed, and the inside of cartridge body 6 is maintained under the condition of normal atmospheric pressure.

When the purge operation is necessary, as shown in FIG. 7(B), according to a command from outside, coupling means 72 is operated to move down movable shaft 78 to bring the shaft into close contact with the external wall of cartridge body 6, whereby a gas flow path consisting of the hollowness inside movable shaft 78, vent hole 7 and the inside of cartridge body 6. At the same time, head 78A slides down the inside of cylinder 76 to form a space of gas chamber 76A, and gas intake 77 becomes open, whereby the compressed gas present inside liquefied gas container 70 swells to blow out through gas intake 77 into gas chamber 76A, and further through the hollowness inside movable shaft 78, and then through vent hole into cartridge body 6 to increase the gas pressure thereinside because the cartridge body is in the closed-up condition. The increased gas pressure pressurizes ink container bag 5 to increase the pressure of the ink inside the container bag, and thereafter the same purge operation as previously described is carried out.

After the purge operation, according to another command from outside, the energization of coupling means 72 is shut off so that it is restored to the condition of FIG. 7(A), whereby the liquefied gas supply is stopped and the inside of cartridge body 6 is restored to normal atmospheric pressure, thus becoming ready for the resumption of the ink jet recording operation. In the above construction of FIG. 7, because movable shaft 78 of coupling means 72 serves also as the control valve, it allows the simplification of the pressurizing mechanism as well as the positive operation, so that the construction is excellent for practical application.

Figure 8:
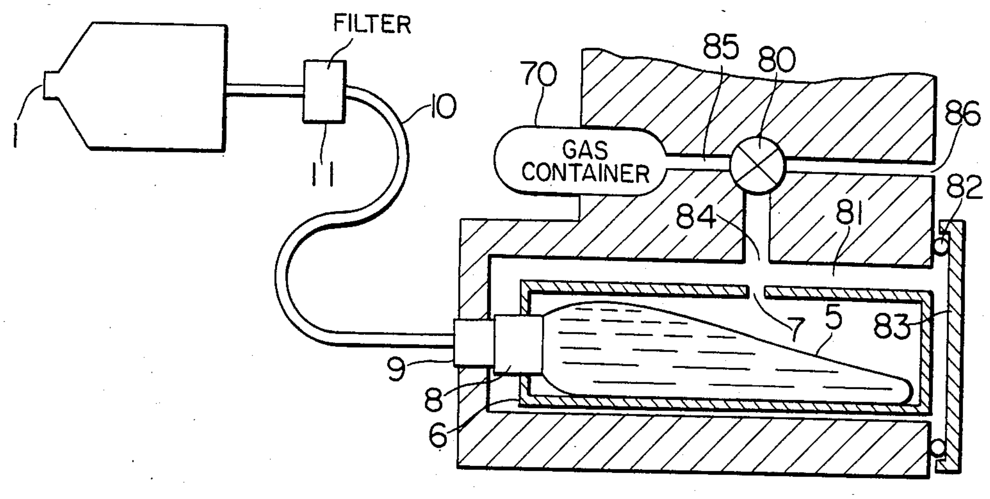

FIG. 8 is a schematic cross-sectional view showing still another example of the present invention. This is the construction characterized by having no movable parts such as the foregoing movable shaft 73 or 78 but designing instead the ink cartridge housing to be of a pressurizable closed-up structure, thereby permitting the improvement of the operation stability.

In the figure, the insertion entry of cartridge loading chamber 81 which is to house an attachable-detachable ink cartridge is closed tight by a tight cover 83 having a sealing member (e.g., O ring) 82, thus being of a structure to isolate the inside of the chamber from the outside air. One of the walls of cartridge loading chamber 81 is pierced with a gas intake 84 which leads to a control valve 80, which, besides gas intake 84, is connected to a gas conduction path 85 and also to the path leading to a gas exhaust port 86, the control valve 80 controlling the above flow paths in the three directions upon receiving an electric signal from outside and being operated by an electromagnet or the like.

The opening-closing operation of the foregoing tight cover is made only when replacing the cartridge for ink replenishment, and except for the replenishment, the tight cover is always in the specified position to maintain the cartridge inside cartridge loading chamber 81 in the closed-up condition.

During the usual recording operation or downtime period, control valve 80 maintains conduction path 85 in the normally-closed condition, and at the same time, renders the path between the cartridge loading chamber 81 and exhaust port 86 in the open condition. That is, under this condition, the gas supply from liquefied gas container 70 is shut off, while the inside of cartridge body 6 is maintained under the condition of normal atmospheric pressure.

Next, when the purge operation is necessary, a command from outside causes valve 80 to act to shut off only the path leading to exhaust port 86, and the other two paths are opened.

By this, the flow path from liquefied gas container 70 through control valve 80 to gas intake 84 becomes open, whereby the pressurizing gas blown out from liquefied gas container 70 flows into cartridge loading chamber 81, and further flows through vent hole 7 into cartridge body 6 to increase the gas pressure thereinside, and the increased gas pressure pressurizes the ink container bag to thereby increase the pressure of the ink contained in the container bag, thus performing the purge operation as previously described.

After completion of the purge operation, another command from outside causes control valve 80 to restore itself to the original position, whereby the pressurizing gas supply is stopped and the restoration of the inside of cartridge body 6 to normal atmospheric pressure, thus becoming ready for the resumption of the ink jet recording operation.

Figure 9:
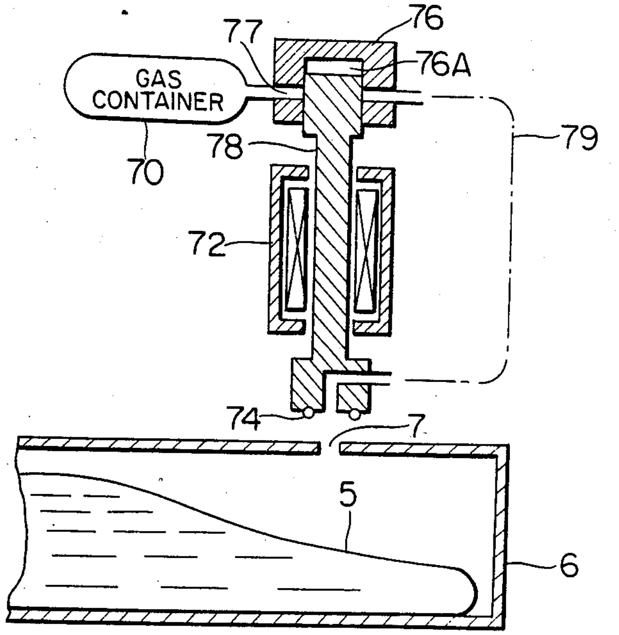

FIG. 9 shows a still further example of the present invention. This is similar to the one shown in FIG. 7(A) and (B), but differs from them in respect that a pipe 79 is provided. The component parts identical to those of FIG. 7(A) and (B) are indicated with the same notations, whose functions and operations are omitted herefrom.

In FIG. 9, the gas present in gas chamber 76A is conducted into gas conduction hole 7. The condition of movable shaft 78 in the up position in the figure shows non-purge period, and during the purge operation, movable shaft 78 is in the down position, so that gas chamber 76A and pipe 79 form a consistent path, whereby the liquefied gas is allowed to flow into cartridge body 6.

Figure 10:
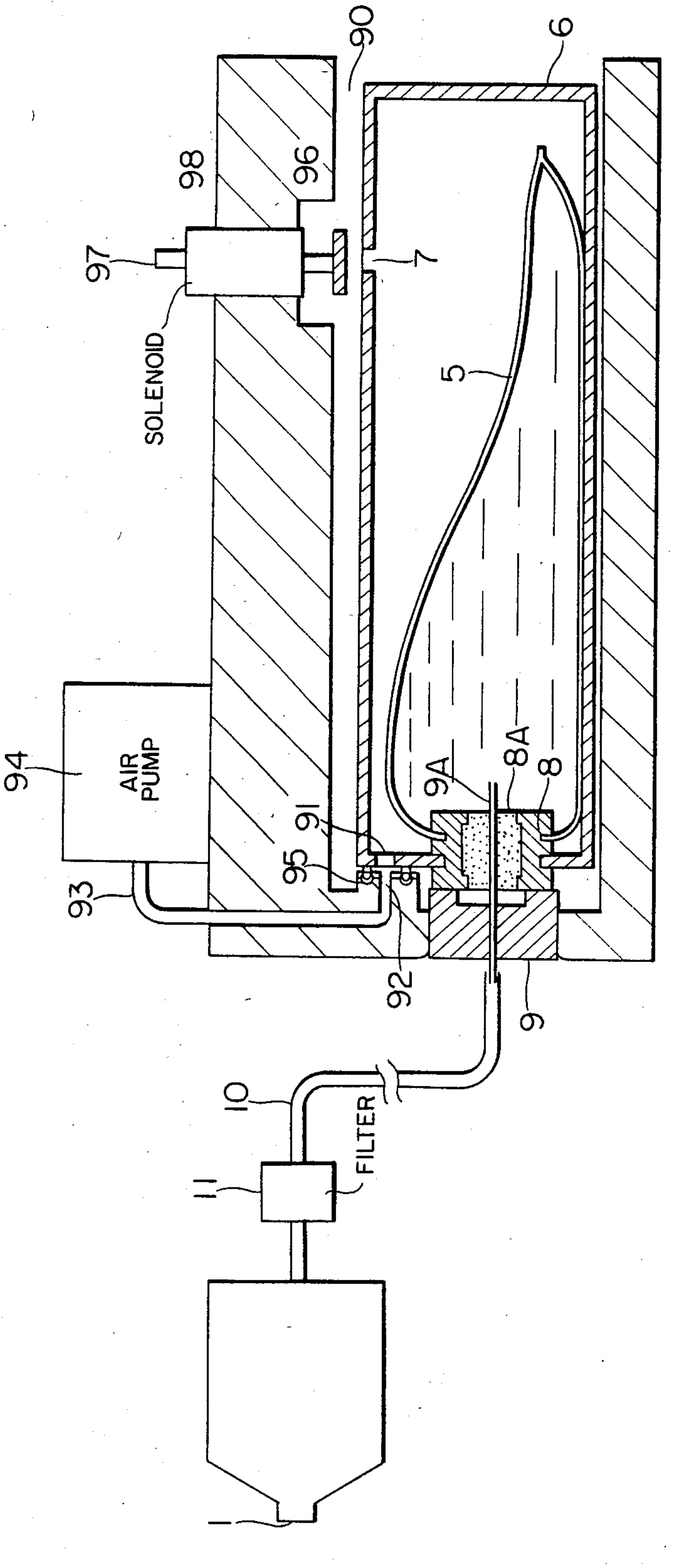
FIGS. 10 and 11 are cross-sectional views of other examples of the ink jet recording apparatus of which the ink cartridge is provided with two openings.

The above examples are all of the construction in which the ink cartridge has a single opening for both the conduction of pressurizing gas therein and exhaust of the gas therefrom, but FIG. 10 shows an example of the construction in which the cartridge is provided with two separate openings; one is for the conduction of a gas and the other for the exhaust of the gas.

The inside of ink cartridge loading chamber 90 is provided with a gas supply hole 92 that is in the position facing a gas conduction hole 91 that forms a part of cartridge body 6 and is connected to gas supply path 93 that is further connected to a compressor air pump 94. In addition, between the gas conduction hole 91 and the gas supply hole 92 is present closely connectable elastic material 95 such as O ring, etc., which is mounted to either of the holes.

Another one of the inside walls of ink cartridge loading chamber 90 is provided with an opening-closing member which opens or closes gas exhaust hole 7 of cartridge body 6. The opening-closing member is composed of a closing-opening valve 96 that hermetically seals or opens the gas exhaust hole 7, a plunger 97 that is integrated with the opening-closing valve 96, and a solenoid that drives the plunger 97.

Figure 11:
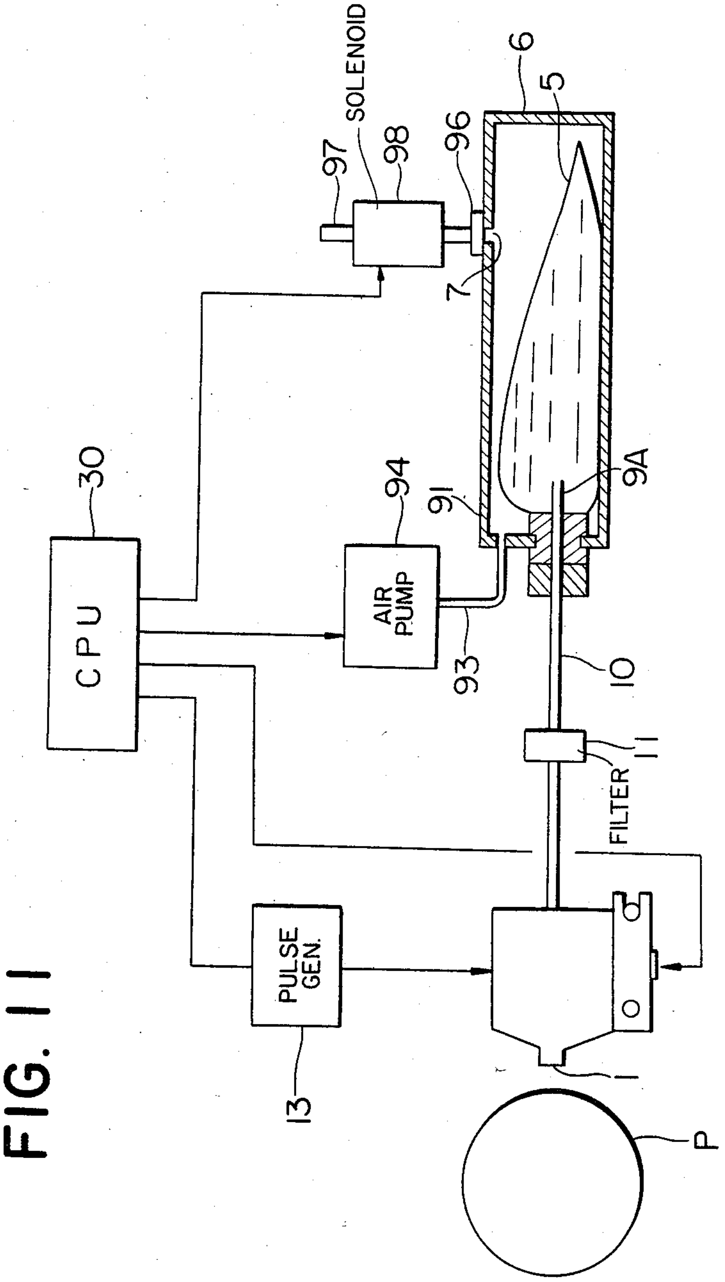

The above is the construction of the ink cartridge and the purge system. The ink supply operation in the above construction is subsequently described below with reference to FIG. 10 and FIG. 11:

FIG. 11 is a schematic diagram showing the operation system wherein the ink supply, pressurizing gas supply, and ink jet recording are performed by microcomputer (hereinafter abbreviated to CPU) control.

During the recording operation, air pump 94 as pressurizing gas supply means is suspended. Solenoid 98 moves up plunger 97 and opening-closing valve 96, so that gas exhaust hole 7 of cartridge body 6 is in the open condition. Therefore, the inside of cartridge body 6 is under the condition of normal atmospheric pressure, and under this condition, the replenishing ink inside ink container 5 is flowing into the recording head, which, in response to electric signals from electron pulse generator 13, performs the ink jet on the drop-on-demand basis from nozzles 1 onto recording paper P, thereby forming ink-dot letters, characters or graphic patterns.

During the ink jet recording operation, if a clogging trouble of nozzles 1 as previously mentioned has been detected, or when intermittent jetting is made at a regular interval for preventing possible clogging troubles, or when purge operation should be made prior to the start of the recording operation or at the time of turning on the power supply to the recording apparatus, or from time to time in case of necessity, first, by the command from CPU 30, the recording head is moved from the recording paper-set position to the specified purge position in the outside of the recording paper position. Subsequently, by another command from CPU 30, solenoid 98 of the opening-closing means is turned ON to cause plunger 97 to stick out to thereby cause opening-closing valve 96 at the tip thereof to press on the external wall surface surrounding gas exhaust hole 7, thus closing the hole 7.

By the subsequent command from CPU 30, compressor air pump 94 is turned ON to start the pressurizing operation, whereby the pressurizing air from compressor air pump 94 is forced to flow through gas supply path 93, gas supply hole 92, gas conduction hole 91 on the cartridge side into cartridge body 6. Because the inside of cartridge body 6 is in advance closed up by solenoid 98, the filling in of the pressurizing gas increases the pressure up to the specified pressurizing condition, whereby the ink inside ink container 5 is pressured, and the pressured ink is forced out of the ink cartridge by a hollow needle 98 and runs through ink supply pipe 10 and filter 11 into the recording head. The pressured ink flows through the ink flow path inside the recording head and is jetted out from nozzles 1 to the outside. At this point of time, the bubbles and solid matter present in the ink flow path, particularly inside nozzles 1 is expelled along with the ink out from nozzles 1 to the outside.

Thus the purge operation is carried out, and after completion of it, by another command from CPU 30, compressor air pump 94 is turned OFF to stop the pressurizing air supply. At nearly the same time, by another command from CPU 30, solenoid 98 of the opening-closing means is turned OFF to return plunger 97 to the original position thereof to thereby move opening-closing valve 96 apart from the wall surface of cartridge body 6, whereby gas exhaust hole 7 becomes open. As a result, the pressurizing air inside cartridge body 6 flows out through exhaust hole 7 into the outside air, and thus the inside of cartridge body 6 is restored to normal atmospheric pressure, and concurrently, the ink pressure inside ink container bag 5 becomes equal to normal atmospheric pressure. Slightly later than this, the ink pressure inside the recording head leading to the ink in ink container bag 5 also returns to the original liquid pressure, so that in nozzles 1, the initial equilibrium becomes maintained. Under this condition, the recording head is moved from the purge position to the recording position, and the ink jet recording operation is resumed.

In the above example, at the time of the purge operation, both the pressurizing gas supply means (air pump, etc.) and opening-closing means (solenoid, etc.) are concurrently driven to pressurize the inside of cartridge body 6. However, there may also be used a different example which is such that compressor air pump 94 is operated upon turning on the power supply, and during the power supply is on, the air pump 94 is driven on, and only at the time of the purge operation, solenoid 98 of the opening-closing means is turned ON to cause opening-closing valve 96 to close exhaust hole 7 to thereby increase the pressure inside cartridge body 6.

Any of the above examples comprises pressurizing gas supply means provided outside the ink cartridge and on the recording apparatus body side, and both pressurizing gas supply means and ink cartridge are coupled by a coupling means, thereby conducting the pressurizing gas into the inside of the cartridge body, but the following is an example wherein the pressurizing gas supply means is provided on the cartridge side. The example is illustrated in reference to FIG. 12 through FIG. 14.

Figure 12A:
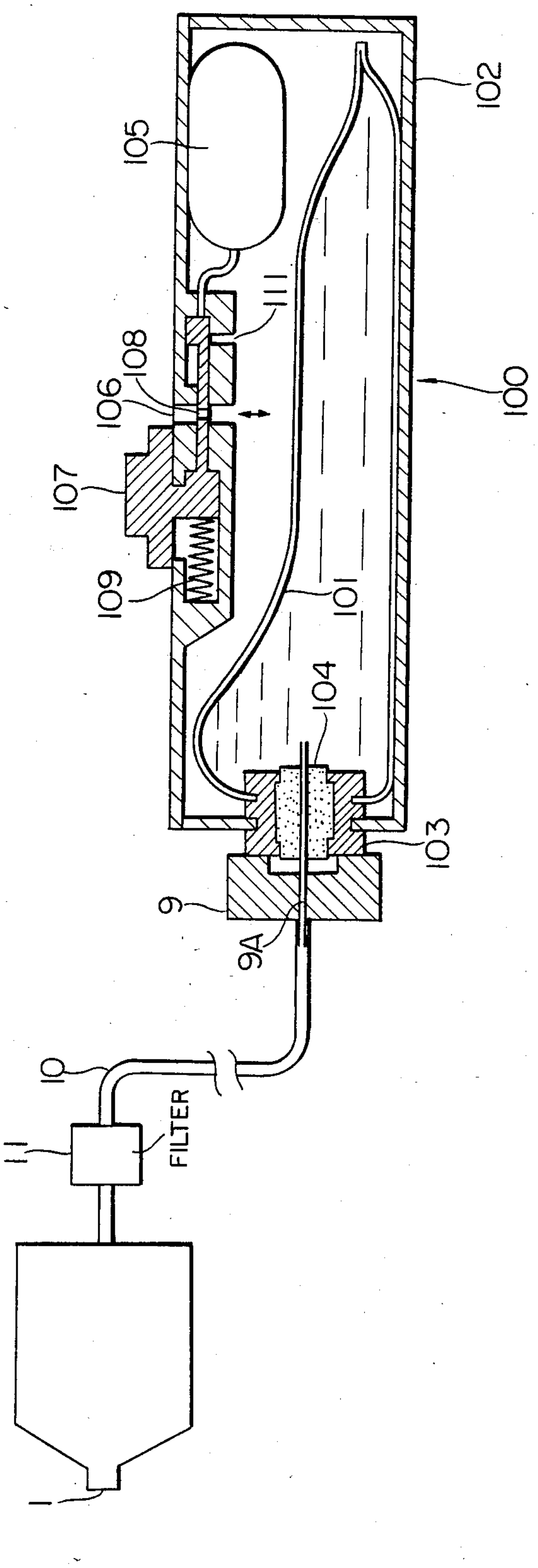
FIGS. 12, 13 and 14 are cross-sectional views of other examples of the ink cartridge and the ink jet recording apparatus of the present invention.

FIG. 12(A) is a cross-sectional view showing the construction of the ink cartridge according to the present invention. Ink cartridge 100 is composed of an ink container bag 101 which is made of a flexible material and filled with replenishing ink; a cartridge body 102 which is of a closed-up rigid construction and which houses the ink container bag 101; a cap 103 which is made of an elastic or rigid material and is closely connected to the mouth of the ink container bag 101 and also fixed to the opening of the cartridge body 102; and an elastic member 104 which is filled in the cap 103 and serves for preventing the leakage of the replenishing ink and the flow in of a gas from outside, and into which a hollow needle, which will be hereinafter mentioned, can be inserted. Further, ink cartridge 100 is provided in the upper portion thereinside with a liquefied gas container 105 which will be hereinafter described and a driving member connected thereto.

Further, the ink cartridge receiver section fixed to the ink jet recording apparatus body is composed of a receiver base 9, a hollow needle 9A which has a very small ink flow path thereinside and is thrusted into the nearly center of the receiver base 9 and is inserted into the ink cartridge; and an ink supply pipe 10 which is connected to hollow needle 9A and also connected through filter 11 to the recording head.

Cartridge body 102 of ink cartridge 100 is of a closed-up structure except vent hole 106. The vent hole 106 is capable of opening and closing by the movement of a small hole 108 provided in a portion of opening-closing member 107 which is slidably provided to one of the walls of cartridge body 102. 109 is a spring which resiliently biases the opening-closing member 107 in one direction. Further, cartridge body 102 is provided at a portion thereof with a liquefied gas blow chamber 110 which leads to liquefied gas container 105, and blow hole 111. And one end of the opening-closing member 107 is closely fitted into the liquefied gas blow chamber 110, and the blow hole 111 is opened or closed according to the sliding movement of opening-closing member 107.

The construction of the ink cartridge according to the present invention is as has been described above, and subsequently the ink supply operation is illustrated below with reference to FIG. 12(A) and (B).

FIG. 12(A) is a cross-sectional view of the ink cartridge in the ink supply condition during the normal ink jet recording operation. In the figure, opening-closing member 107 is laterally movable and resiliently biased by a spring to be stopped. Under this condition, vent hole 106 and small hole 108 of opening-closing member 107 are coincident with each other and in the open condition, so that outside air is freely flowing in and out of cartridge body 102, and the inside thereof is under atmospheric pressure, whereby the ink inside ink container bag 101, under normal hydrostatic pressure by atmospheric pressure, is supplied through hollow needle 9A, ink supply pipe 10 and filter 11 into the recording head, thus performing the ink jet recording. At this time, blow outlet 111 is closed by the right side end of opening-closing member 107, so that the gas supply from liquefied gas container 105 is shut off.

Figure 12B:
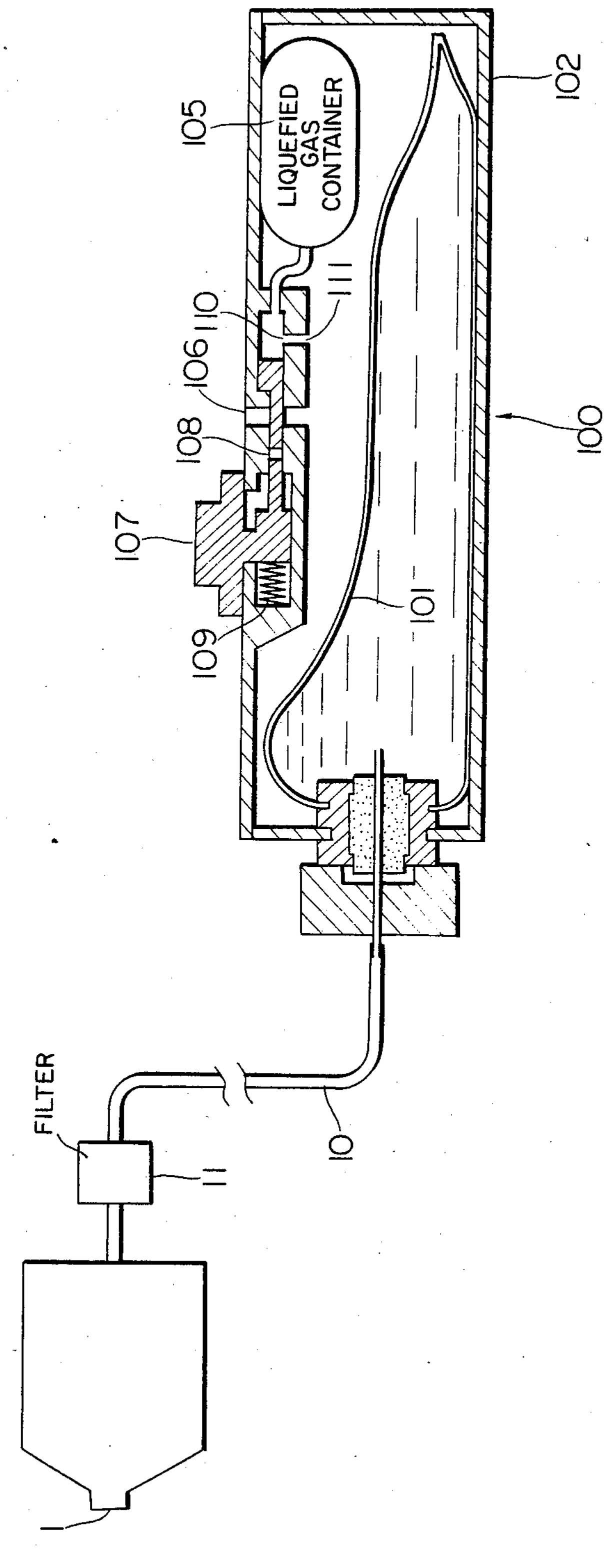

FIG. 12(B) is a cross-sectional view of the ink cartridge in the condition of pressurizingly supplying ink during the purge operation to expel bubbles and solid matter from the recording head or from the ink flow path. In the figure, opening-closing member 107 is manually or automatically moved leftward against the spring force and then locked. Under this condition, vent hole 106 and small hole 108 of opening-closing member 107 is inconsistent with each other, so that the air intake is closed, and the inside of cartridge body 102 becomes in the closed-up condition. At the same time, blow outlet 111 becomes in the open condition by the leftward movement of opening-closing member 107, so that the gas inside the liquefied gas container flows through blow chamber 110 and blow outlet 111 into the closed-up conditioned cartridge body 102 to thereby increase the gas pressure inside the body, whereby ink container bag 101 is pressured to thereby pressurize the ink thereinside and the ink is supplied through the ink flow path into the recording head and expelled from the nozzles. At this point of time, bubbles and solid matter are forced to run along with the ink to be expelled from the nozzles to the outside.

After completion of the above purge operation, opening-closing member 107 is again slided rightward to be restored to the condition of FIG. 12(A), whereby the supply of the liquefied gas is stopped, vent hole 106 becomes again in the open condition, the pressurizing gas inside cartridge body 102 is expelled through vent hole 106 to the outside, and thus the inside cartridge body 12 is restored to normal atmospheric pressure. This condition permits the resumption of the ink jet recording.

As has been described, according to the present invention, the liquefied gas pressuring means-built-in ink cartridge is connected to the ink cartridge receiver section of the recording apparatus, and opening-closing member 107 is manually or automatically slided repeatedly, whereby the purging can be safely and positively carried out. After completion of the purge operation, the opening-closing member is returned to the original position, whereby the initial ink supply under normal hydrostatic pressure can be accomplished, so that the operation is very easy.

Figure 13:
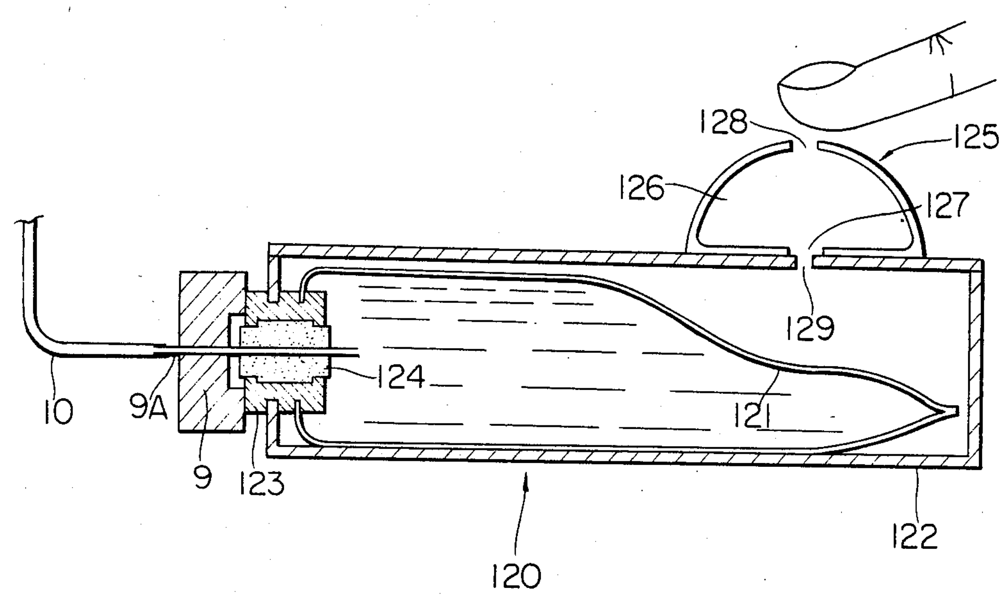

FIG. 13 is a cross-sectional view of ink cartridge 120 as another example of the present invention. This is characterized by the provision of a manual blower 125 having a nearly hemispheric pressure chamber 126 capable of compressing air and consisting of an elastic material on the external of cartridge body 122. The top wall of cartridge body 122 is pierced with a vent hole 129 which allows air to flow in and out and which is arranged so as to be coincident with the opening at the bottom of blower 125. The top of blower 125 is pierced with an opening 128. Manual blower 125, pressure chamber 126, openings 27 and 128, cartridge body 122, and vent hole 129 all are open to the outside air, whereby the inside pressure of cartridge body 122 and the ink pressure inside ink container bag 121 are equal to normal atmospheric pressure, and the ink under normal hydrostatic pressure is supplied into the recording head to carry out the normal ink jet recording operation.

When the purge operation is performed to expel bubbles and solid matter, opening 128 of manual blower 125 is closed to be depressed by a finger tip or any appropriate operation member to compress the air inside pressure chamber 126 to force the air to flow into cartridge body 122 to increase the air pressure thereinside to pressurize the ink inside ink container bag 121, and after that, in the same manner as in above, bubbles and solid matter are expelled along with the ink from the nozzles of the recording head.

After completion of the purge operation, when releasing the finger's or operation member's hold of opening 128 of blower 125, manual blower 125 is restored to its original form, and at the same time the pressurizing air inside cartridge body 122 flows out through openings 129, 127 and 128 to the outside, and the air pressure inside cartridge body 122 and the ink pressure inside ink container bag 121 are restored to normal atmospheric pressure, thereby allowing the ink jet recording operation. This system is simple and especially useful for the ink cartridge which does not require a large pressure.

Figure 14:
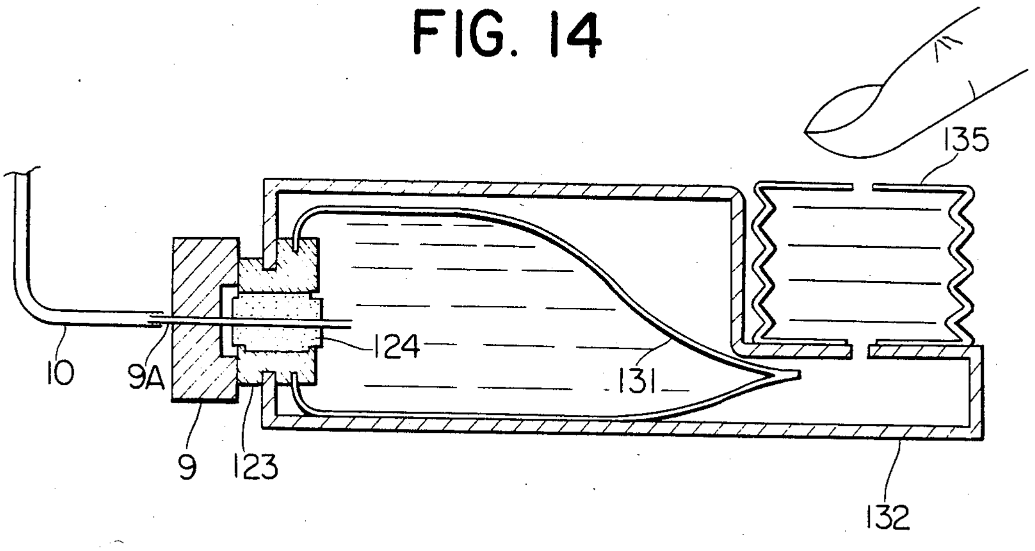
Figure 15:
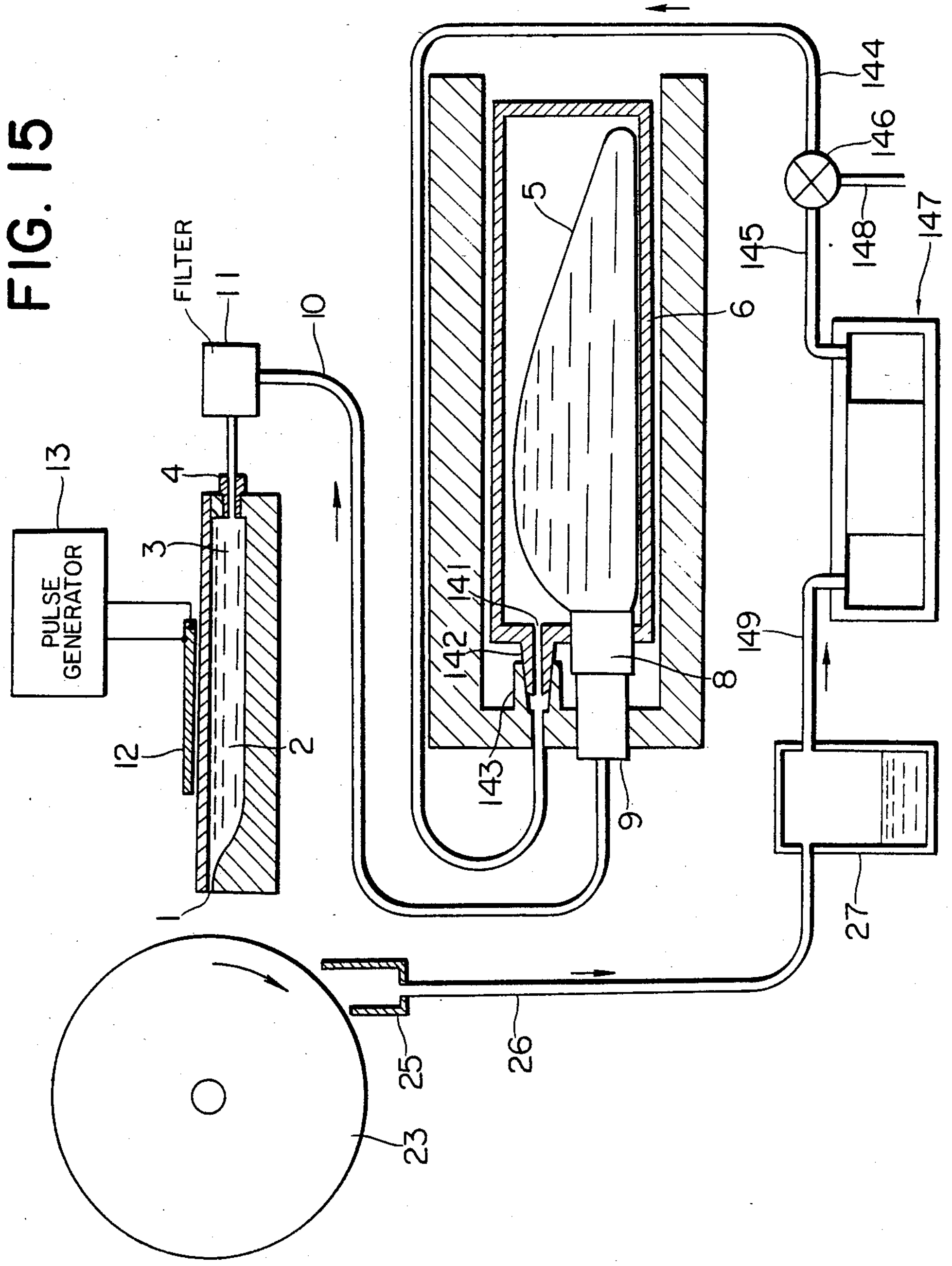
FIGS. 15, 16 and 17 are cross-sectional views of examples of the supply-exhaust system for pressurizing and sucking ink in the ink jet recording apparatus of the present invention.

FIG. 14 is still another example of the ink cartridge of the present invention. This is the construction wherein the above hemispheric elastic manual blower 125 is replaced by an accordion-type elastic walls-having bellows blower 135 which is provided on cartridge body 132. In this instance, the contraction of the volume of the air inside bellows blower 135 forces the air to flow in and the restoration of the air volume restores the air pressure to normal atmospheric pressure.

The air supply and exhaust system for use in pressurizing the ink and in the recovery of ink waste during the purge operation to expel bubbles and foreign matter from the ink flow path in the ink jet recording apparatus that uses the above normal hydrostatic pressure-type ink cartridge is explained in accordance with FIG. 15 through FIG. 18.

The air supply and exhaust system is as follows: In the ink jet recording apparatus comprising jet nozzles, a pressure chamber leading to the jet nozzles, a recording head having a common ink chamber whose capacity is relatively large for supplying ink to the pressure chamber, and an ink cartridge for replenishing ink to the common ink chamber, the foregoing air supply and exhaust system comprises an air pump which is commonly used as a compressor air pump for increasing the air pressure inside the ink cartridge for purging the bubbles and solid matter present inside the ink flow path from the ink cartridge to the jet nozzles, and also as a suction pump to collect the ink expelled from the nozzles.

Cartridge body 6 which houses ink container bag 5 is of a closed-up structure except vent hole 141, and normally air is freely flowing through vent hole 141 in and out of the cartridge body. With the ink cartridge properly loaded by connecting it to connector 9 of the recording apparatus body, a coupling means 142 is fixed to the outside of vent hole 141, and the coupling means 142 is engaged with a coupling means 143 on the recording apparatus body side, and from the coupling means an air flow path is formed by pipes 144 and 145, control valve 146 leading to air pump 147. The control valve 146 controls the above-mentioned air flow path in the three directions, and as the valve an electromagnetic valve operated by an electromagnet which acts upon receiving an electric signal is used. Control valve 146, except when the purge operation is performed, normally makes pipes 144 and 148 open to allow air to flow therethrough (normally open), so that the air inside cartridge body 6 is under atmospheric pressure leading to the outside air.

During the non-recording period, when the purge operation is necessary, control valve 146 is driven to close pipe 148, and at the same time, pipes 145 and 146 become in an air-flowable condition, thereby forming an air flow path through which the pressurizing air from air pump 147 is forced to flow toward the ink cartridge. Under this condition, air pump 147 operates and the pressurizing air from air pump 147 flows through pipes 145 and 144, and control valve 146 which form the above path, and further through connector 143 and hollow projection 142 into cartridge body 6, thereby increasing the air pressure inside cartridge body 6 to pressurize the inside ink container bag 5, whereby the ink thereinside is pressured. As a result, the pressured ink in ink container bag 5 is forced to run through cap 8 and connector 9 connected thereto, ink supply pipe 10 and filter 11 and then through inlet means 4 into nozzles 1 to be jetted therefrom. At this point of time, the bubbles and solid matter present inside nozzles 1 and the recording head are purged along with the ink to the outside, whereby the clogging is cleared.

Outside nozzles 1, there is a cleaning roller 23 rotating which is in the position confronting closely to the nozzles. And an ink waste receiver 25 is provided underneath the cleaning roller 23 and positioned closely to or rubbingly contacted with the peripheral surface of the roller 23 and connected to pipe 26 that is connected to a closed-up waste recovery tank 27 that is further connected to air pump 147.

When the above purge operation is performed, bubbles and solid matter are expelled along with the pressured ink through nozzles 1, and the expelled ones attach onto the peripheral surface of cleaning roller 23 and are transported by the rotation of the roller to waste receiver 25, where they are collected into the receiver by the suction air flow thereby to be forced to run through pipe 26 into and stored in waste recovery tank 27.

As has been mentioned, in the ink jet recording apparatus of the present invention, the flows of ink and air for the purge operation consist of the following broadly classified three systems:

(1) The pressurizing air supply system from air pump 147 through control valve 146 to cartridge body 6, (2) the pressured ink supply system having the ink flow path from ink container bag 5 to nozzles 1 of the recording head, and (3) the bubbles/solid matter-containing ink waste suction system from cleaning roller 23 through waste receiver 25 and waste recovery tank 27 to air pump 147.

Of the above systems, the pressurizing air supply system (1) and the ink waste suction system (3) are performed by the simultaneous supply and suction operations, respectively, by the drive of a common air pump 147. That is, air pump 147 according to the present invention has thereinside, as a power source, any one of an electric motor, electromagnetic solenoid, linear actuator, and the like, and to any one of them are provided a compressor pump and suction pump. Alternatively, there may be provided a pump commonly usable for both pressure supply and suction.

Figure 16:
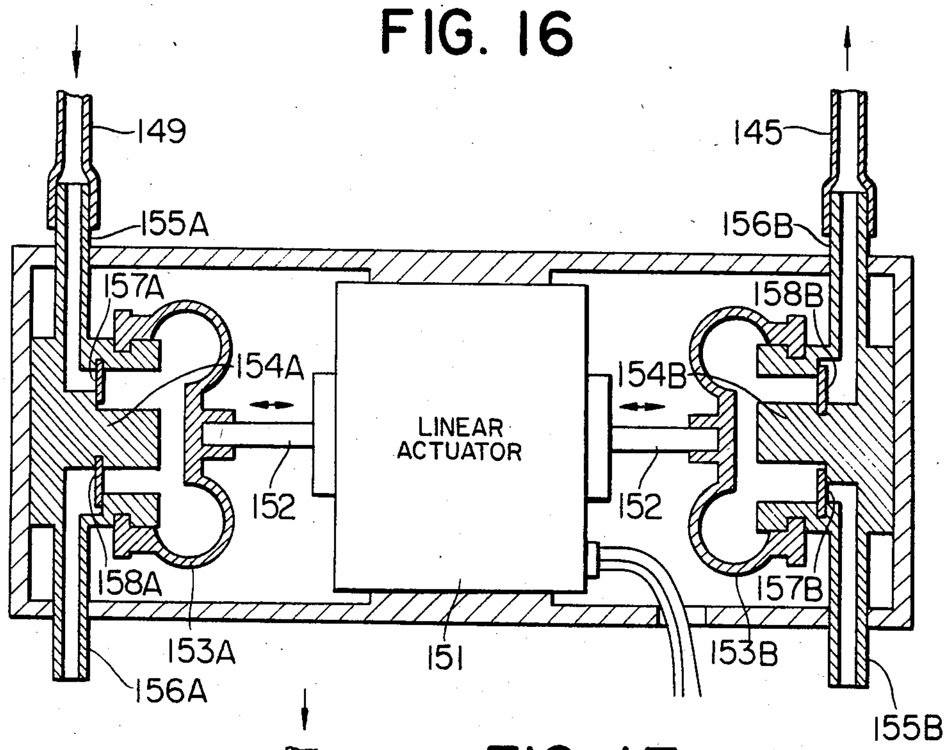

FIG. 16 is a cross-sectional view showing an example of the air pump in accordance with this invention. In the figure, 151 is a linear actuator body consisting principally of two electromagnetic coils (stators) which are fixed to the body and permanent magnet-fixed axially reciprocatingly movable shaft 152. The linear actuator is a driving power source of such a structure that when an electric current is applied through a lead wire from outside to the electromagnetic coils, the permanent magnet-fixed shaft, by the magnetic field of the electromagnetic coils, makes reciprocating movement in the axial direction. To both ends of shaft 152 are fixed two pump diaphragms 153A and 153B, respectively. The diaphragms each is made of an elastic rubber-like material and has thereinside a contractible and expandable chamber, and diaphragm 153A and diaphragm 153B are fixed to valve bodies 154A and 154B, respectively. Valve body 154A has thereinside a suction valve 157A and exhaust valve 158A, and the outside of these valves lead to a suction pipe 155A and exhaust pipe 156A, respectively.

Similarly, valve body 154B on the opposite side is composed of suction valve 157B, exhaust valve 158B, suction pipe 155B and exhaust pipe 156B. Suction pipe 155A is connected to pipe 149 leading to the foregoing waste recovery tank 27, and exhaust pipe 156B is connected to pipe 145 leading to control valve 146.

By a command from CPU 30, when the electromagnetic coils in linear actuator body 151 are energized, shaft 152 makes a laterally reciprocating movement, whereby diaphragms 153A and 153B on both sides are compressed and expanded, and by the pressure difference between the inside chambers and by the actions of the foregoing respective valves making one directional movements, suction and exhaust operations are carried out. That is, when shaft 152 moves rightward, the inside volume of diaphragm 153A is increased to cause the pressure thereinside to become a negative pressure, so that suction valve 157A opens to cause the chamber to suck the outside air through suction pipe 155A. During this time, exhaust valve 158A remains closed.

On the other hand, by the rightward movement of the above shaft 152, diaphragm 153B fixed to the right side end of shaft 152 is compressed rightward to decrease the volume of the chamber to cause the pressure thereinside to become pressurized to open exhaust valve 158B to exhaust the air through exhaust pipe 156B. During this time, suction valve 157B remains closed.

Thus, by the rightward movement of shaft 152 of the linear actuator, the air pump on the left side makes a suction operation and the air pump on the right side makes an exhaust operation simultaneously, whereby the ink waste suction and recovery operations and the cartridge pressurizing operation are performed at the same time.

When a reverse current is applied to the electromagnetic coils in actuator body 151, shaft 152 moves leftward to make reverse operations to the above-described operations. That is, the air pump on the left side with its exhaust valve 158A opened becomes a compressing process to release the air inside the chamber to the outside. During this time, suction valve 157A remains closed, so that the suction operation of sucking air from suction pipe 155A is not performed. The leftward movement of shaft 152, at the same time, causes the air pump on the right side with its suction valve 157B opened to become a suction process to suck the outside air through suction pipe 155B. During this time, exhaust valve 158B remains closed, so that the exhaust operation of exhausting air through exhaust pipe 156B is not performed. Thus, when shaft 152 moves leftward, the pump on the left side releases air to the outside, while the pump on the right side sucks the outside air, so that they do not make directly the suction and exhaust for the purge operation but cause the air inside the pump chambers to flow out and the outside air to flow in to thereby restore the air pressure to prepare for the subsequent processes.

Thus, the forward movement of shaft 152 performs both suction and exhaust for the purge operation and the backward movement performs the restoration. This reciprocating movement is made in succession oscillatingly, whereby the suction and exhaust necessary for the purge operation are carried out for a given period of time.

As described in above, the air pump of the present invention for use in the purge operation is characterized by the construction that a suction pump and an exhaust-pressurizing pump are integrated into one unit with use of a linear actuator as the driving power source therefor, and both pumps are simultaneously operated.

The linear actuator 151 used in the above example is a small, light-weight and high-thrust-having actuator whose structure is simple and solid (having a high liability), and excellent in the thrust characteristic and responsiveness. In addition to the above actuator, as the driving power source, an electric motor may be used of which the revolving power is converted through a cam into a linear movement or reciprocating movement to thereby drive the air pump. Further, as another method, an electromagnet and spring member or an electromagnetic solenoid, or the like, may also be used as the driving power source.

Figure 17:
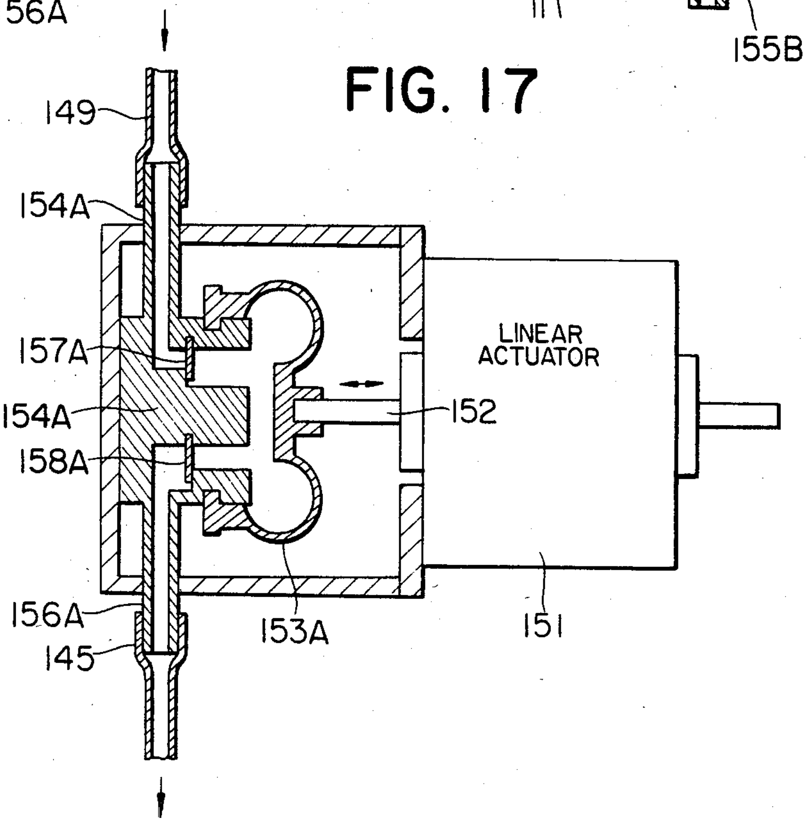

FIG. 17 is a cross-sectional view showing a further example of the air pump in the present invention. The air pump system is such that the structure thereof is more simplified by using the above linear actuator to which is provided an air pump to be driven by the linear actuator to thereby perform suction and exhaust operations. The drawing in FIG. 17 is similar to the left-side part of the construction shown in FIG. 16, and the notations used herein are identical with those used in FIG. 16.

By the leftward movement of shaft 152 of linear actuator 151, diaphragm 153A is compressed to pressurize the air inside the pump chamber, the pressured air opens exhaust valve 158A and is forced to run toward exhaust pipe 156A, then runs through pipe 145 and control valve 146 into cartridge body 6 to pressurize ink container bag 5.

Next, by the rightward movement of shaft 152, diaphragm 153A is expanded so that the air pressure inside the pump chamber becomes a negative pressure, which opens suction valve 157A to suck air through pipe 155A. This suction operation performs the recovery of ink waste through pipe 149.

When the above suction and exhaust operations are repeatedly made in the oscillating manner, the specified purge operation is carried out.

As the driving power source in this instance, in addition to the above linear actuator 151, the foregoing electric motor, electromagnet, electromagnetic solenoid, and the like, may also be used.

The ink recording apparatus of the present invention having any of the constructions that have been described above is such that the air pressure inside the cartridge body that houses an ink container bag containing recording ink, when the purging of the recording head with the nozzles is necessary during the non-recording period, is increased to thereby purge the bubbles and solid matter along with the ink present inside the recording head from the nozzles, and further the expelled ink waste is recovered by suction, and particularly the purge operation is made by the above air pump-driving power source integrated system simultaneously performing both air-pressure increase and suction operations. By this, not only is the structure of the air pump system simplified but the realization of a compact and light-weight recording apparatus as well as the improvement in liability and easy maintenance thereof can be accomplished, thus having a significantly large effect on the practical application.

What is claimed is:

1. In a method for ink jet recording which uses an ink jet recording apparatus comprising an ink-on-demand-type recording head which jets recording ink through nozzles thereof to make recordings, said recording ink being forcibly sent from a pressure chamber to said nozzles; an ink cartridge comprised of an ink container bag filled with said recording ink and having a yieldable portion; and an ink cartridge body which houses said ink container bag, said ink cartridge body having at least one opening therein, said method comprising a purging step including:

selectively forcibly conducting a gas during a non-recording period by a gas pressurizing means through said at least one opening of said ink cartridge body and into said ink cartridge body to thereby increase the pressure inside said ink cartridge body to cause said yieldable portion of said ink container bag to yield to pressurize said ink inside said ink container bag so that the pressurized ink flows into said recording head to thereby purge said recording head from bubbles or the like along with the ink thereinside; and selectively opening said at least one opening of said ink cartridge body to the atmosphere to prevent a purging operation of said recording head.

2. In an ink jet recording apparatus comprising:

an ink-on-demand type recording head which jets recording ink through nozzles thereof to make recordings, said recording ink being forcibly sent from a pressure chamber of said recording head to said nozzles; and an ink cartridge comprised of an ink container bag filled with said recording ink and an ink cartridge body which houses said ink container bag, said ink container bag having at least a flexible portion;

the improvement comprising:

said ink cartridge body being a closed-up, substantially rigid body having at least one opening therein for permitting gas to selectively flow in and out of said substantially rigid cartridge body, said cartridge body housing said ink container bag;

a pressurizing gas supply means which selectively supplies gas under pressure to said at least one opening of said ink cartridge body for increasing the pressure inside said ink cartridge body when it is selectively supplying said pressure gas to said at least one opening of said ink cartridge body for thereby increasing the pressure around the outside of said ink container bag and thereby increasing the pressure of the ink inside said ink container bag due to flexing under said increased pressure of said flexible portion thereof;

a cap made of an elastic material and coupled to said ink container bag in a liquid tight manner for supplying said recording ink from inside said ink container bag into said recording head under said pressure to purge said recording head of bubbles and of ink previously contained therein when said gas supply means is supplying said pressure gas to said at least one opening of said ink cartridge body; and means for selectively venting said at least one opening of said ink cartridge body to prevent said purging of said recording head.

3. The ink jet recording apparatus of claim 2, wherein said pressurizing gas supply means comprises an air pump.

4. The ink jet recording apparatus of claim 2 wherein said pressurizing gas supply means comprises said air pump and a coupling means that couples said air pump to an opening of said ink cartridge body.

5. The ink jet recording apparatus of claim 3 wherein said pressurizing gas supply means comprises said air pump and a control valve that controls the conduction and exhaust of pressurizing gas into and from an opening of said ink cartridge body.

6. The ink jet recording apparatus of claim 2, wherein said pressurizing gas supply means comprises a manual blower and a coupling means that couples said manual blower to an opening of said ink cartridge body.

7. The ink jet recording apparatus of claim 2, wherein said pressurizing gas supply means comprises a heating chamber and a coupling means that couples said heating chamber to an opening of said ink cartridge body.

8. The ink jet recording apparatus of claim 2, wherein said pressurizing gas supply means comprises a liquefied gas.

9. The ink jet recording apparatus of claim 2, wherein said pressurizing gas supply means is attachably and detachably coupled to a pressurizing gas conduction and exhaust opening of said cartridge body.

10. The ink jet recording apparatus of claim 2, wherein said ink cartridge body is provided with a gas conduction opening and a separate gas exhaust opening.

11. The ink jet recording apparatus of claim 2, wherein said ink cartridge is provided thereinside with a pressurizing means that pressurizes the ambient gas around said ink container bag.

12. The ink jet recording apparatus of claim 11, wherein said pressurizing means comprises a liquefied gas.

13. The ink jet recording apparatus of claim 11, wherein said pressurizing means comprises a contractible and expandable pressure chamber having a closeable outside air conduction opening.

14. The ink jet recording apparatus of claim 4, wherein said pressurizing gas supply means comprises said air pump and a control valve that controls the conduction and exhaust of pressurizing gas into and from said opening of said ink cartridge body.

* * * * *